United States Patent [19]

Hultberg

[11] Patent Number: 4,928,810
[45] Date of Patent: May 29, 1990

[54] CONVEYOR

[75] Inventor: Jimmy Hultberg, Ryd, Sweden

[73] Assignee: AB Volvo, Goteborg, Sweden

[21] Appl. No.: 313,266

[22] PCT Filed: Sep. 11, 1987

[86] PCT No.: PCT/SE87/00411

§ 371 Date: Feb. 8, 1989

§ 102(e) Date: Feb. 8, 1989

[87] PCT Pub. No.: WO88/01976

PCT Pub. Date: Mar. 24, 1988

[30] Foreign Application Priority Data

Sep. 19, 1986 [SE] Sweden ................... 860361

[51] Int. Cl.$^5$ ................... B65G 15; B65G 44
[52] U.S. Cl. ................... 198/699.1; 198/726; 198/734
[58] Field of Search ............... 198/606, 626, 627, 628, 198/699.1, 434, 726, 725, 734

[56] References Cited

U.S. PATENT DOCUMENTS

| 137,224 | 3/1873 | Mansfield | 198/699.1 X |
|---|---|---|---|
| 1,843,453 | 2/1932 | Littlefield | 198/726 X |
| 1,845,127 | 2/1932 | Clark | 198/726 |
| 3,237,757 | 3/1966 | Perkins | 198/699.1 X |
| 3,325,977 | 6/1967 | Kirsten | 198/627 X |
| 3,680,678 | 8/1972 | Ganz | 198/434 X |
| 4,502,592 | 3/1985 | Ramcke | 198/627 |
| 4,529,082 | 7/1985 | Mally | 198/627 X |
| 4,571,236 | 2/1986 | Adams | 198/726 X |

FOREIGN PATENT DOCUMENTS

| 0122606 | 10/1984 | European Pat. Off. . | |
|---|---|---|---|
| 2501001 | 4/1976 | Fed. Rep. of Germany . | |
| 1023148 | 3/1953 | France | 198/699.1 |
| 1191374 | 11/1985 | U.S.S.R. | 198/699.1 |
| 2114524 | 8/1983 | United Kingdom . | |

Primary Examiner—Robert J. Spar
Assistant Examiner—D. Glenn Dayoan
Attorney, Agent, or Firm—Young & Thompson

[57] ABSTRACT

A conveyor comprising at least one endless conveyor element, and a plurality of pushers (7, 8, 9) which are carried by the conveyor element and which are adapted to push objects on the conveyor. The pushers (7, 8, 9) have at least two different cross sectional shapes that vary from pusher to pusher lengthwise of the conveyor, for pushing different types of solid objects along the conveyor. These different shapes of pushers (7, 8, 9) are arranged in predetermined fixed positions and in sequential order along the conveyor element (2, 3, 4), and the distance along the conveyor element (2, 3, 4) between a pusher (7, 8, 9) and the next pusher of the same cross sectional shape is the same for all types of pushers (7, 8, 9).

2 Claims, 1 Drawing Sheet

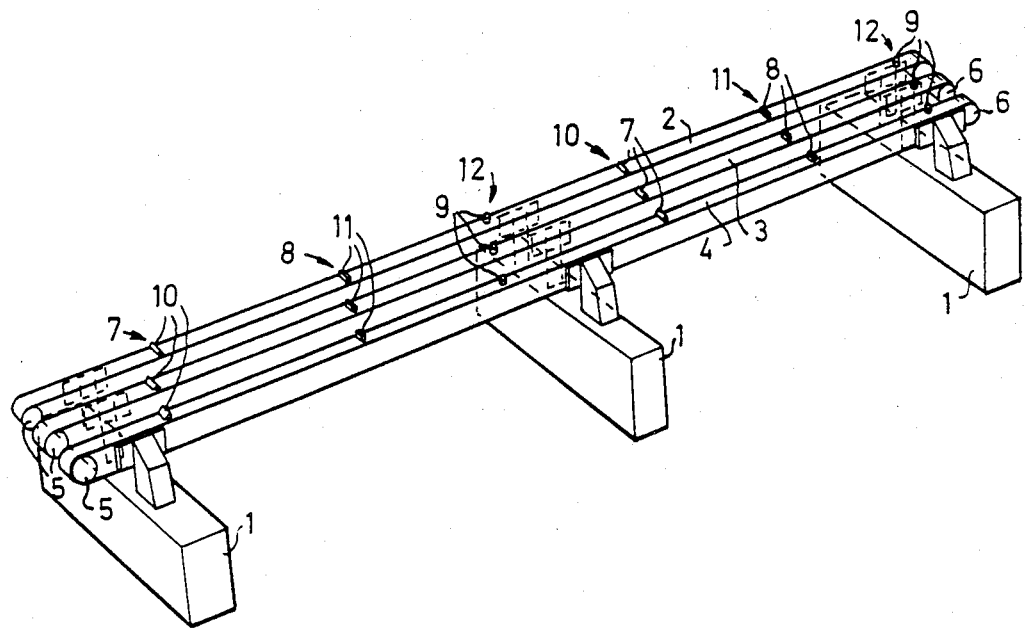

CONVEYOR

The present invention relates to a conveyor with at least one endless conveyor element, said conveyor comprising a plurality of pusher or entraining means which are carried by the conveyor element or elements and are intended to push or entrain objects on the conveyor.

Conveyors with endless conveyor elements are used in many different contexts, e.g. belt conveyors with a single endless belt or several endless belts running in parallel to each other, to convey objects between various stations for processing the objects or the like. In many cases it is important that the objects leave the conveyor at predetermined intervals and with a predetermined orientation. For this purpose pushers or entraining means are used which are carried by the conveyor element or elements, and these are intended to engage the objects and push or entrain them and are often shaped to conform with the objects in question. They can also be arranged in groups with the individual entraining means having a special placement in relation to the rest of the entraining means in the group in order for the object in question to be able to be conveyed by the conveyor in the desired manner.

In many cases it can also be desirable to use the same conveyor for conveying different types of objects at different times. This can be the case for example when the conveyor is used for conveying objects between two presses in sequence in a device for pressing sheet metal parts. Previously these conveyors have been provided with interchangeable and removable entraining means to be able to convert and adapt the conveyor to a different type of object to be conveyed. In this case it has, however, been necessary to stop the conveyor to move and/or replace the entraining means. This means that the entire pressing device or at least portions thereof must be shut down. This is a substantial disadvantage with regard to production.

The purpose of the present invention is to achieve a conveyor of the type described by way of introduction which makes it possible to convey several different types of objects with the same conveyor without the necessity of talking the conveyor out of operation for replacement or resetting of entraining means. This is achieved according to the invention by means of a device which is characterized in that the pusher or entraining means are of at least two different types and/or are arranged in groups in at least two different types of groups for interaction with and pushing or entraining of various objects along the conveyor, that the various types of pusher or entraining means and/or groups of pusher or entraining means are arranged in sequential order along the conveyor, and that the distance along the conveyor between a pusher or entraining means or a group of pusher or entraining means and the next pusher or entraining means or group of the same type is the same for all types of pusher or entraining means and groups of pusher or entraining means.

The invention will be described in more detail below with reference to the accompanying drawing, which shows somewhat schematically a perspective view of a conveyor according to the invention.

A conveyor is shown in the drawing which is supported by supports 1 and consists essentially of three conveyor elements in the form of endless belts 2,3,4. The belts 2,3,4 are arranged in spaced parallel relationship and run over synchronically driven drums 5. At the other end of the conveyor, the belts 2,3,4 run over redirecting drums 6. In order to prevent longitudinal slipping of the belts, the belts and at least the driving drums 5 are suitable provided with teeth or the like to provide secure non-slipping engagement.

In accordance with the invention, the belts 2,3,4 are provided with pushers or entraining means 7,8,9. In the embodiment shown, the entraining means 7,8,9 are of various types, i.e. they have different constructions to cooperate with and entrain various objects placed on the conveyor. The entraining means 7,8,9, respectively, are arranged in groups 10,11,12, respectively. These groups 10,11,12 are arranged in a repeating sequence along the conveyor, as can be seen in the drawing. The placement is such that the distance between the first entraining means in one group and the first entraining means in the next group of the same type along the conveyor is the same for all types of groups. For example, the distance between two entraining means 7 on belt 2, i.e. between two entraining means of the same type, is equal to the distance between two entraining means 8 or two entraining means 9 on the belt 2. This means that the spacing between the entraining means group 10,11,12 will be the same in the longitudinal direction of the conveyor. The spacing is of course chosen so that there is sufficient room between the entraining means groups 10,11,12 or the objects which are to be advanced with the aid of the conveyor. Furthermore, the spacing is selected so that the entire length of the belt is an integral multiple of the spacing.

When using the conveyor for conveying a certain type of object, for example with the aid of the entraining means 7 in the group 10, the conveyor is advanced until the entraining means 7 in a group 10 are located at a station for receiving objects. When an object has been placed on the conveyor, it is advanced with the aid of the entraining means 7, the speed of advance of the conveyor being selected so that the next group 10 with entraining means 7 will be at the receiving station in time to receive the next object. The rate of advance of the conveyor is thus determined by the spacing between the groups of entraining means 10.

When going over the conveyance of objects of another type, for example using the entraining means 8 in groups 11, this is very simply effected by advancing the entraining means 8 to the receiving station, and operation proceeds in a manner corresponding to that described above. The same also applies of course when changing to conveyance of objects by means of the entraining means 9 in the groups 12.

The invention is of course not limited to the example described above. Rather, changes can be made within the scope of the following claims. For example, it is possible, instead of using three different types of entraining means, to have two different types or four or more different types. Also the conveyor does not need to consist of three parallel conveyor elements, but can consist of any desired number of conveyor elements. The relative placement of the entraining means in the respective group of entraining means can also be adjusted to the conditions in question. For example, the entraining means can be placed both in front of and behind an object to provide precise orientation thereof.

I claim:

1. A conveyor comprising at least one endless conveyor element, a plurality of pusher means (7, 8, 9) which are carried by said at least one conveyor element and which are adapted to push objects on the conveyor, said pusher means (7, 8, 9) having at least two different cross sectional shapes that vary from pusher means to pusher means lengthwise of the conveyor for pushing different types of solid objects along the conveyor, said different shapes of pusher means (7, 8, 9) being arranged in predetermined fixed positions and in sequential order along said at least one conveyor element (2, 3, 4) and the distance along said at least one conveyor element (2, 3, 4) between a pusher means (7, 8, 9) and the next pusher means of the same cross sectional shape being the same for all types of pusher means (7, 8, 9).

2. The conveyor as claimed in claim 1, said at least two different cross sectional shapes of pusher means (7, 8, 9) having different horizontal widths transversely of the endless conveyor element.

* * * * *